(12) United States Patent  (10) Patent No.: US 8,843,691 B2
Calvert et al.  (45) Date of Patent: Sep. 23, 2014

(54) PRIORITIZED ERASURE OF DATA BLOCKS IN A FLASH STORAGE DEVICE

(75) Inventors: William Calvert, Cranleigh (GB); Stephen Russell Boorman, Bookham (GB); Simon Mark Haynes, Send (GB)

(73) Assignee: STEC, Inc., Santa Ana, CA (US)

(*) Notice: Subject to any disclaimer, the term of this patent is extended or adjusted under 35 U.S.C. 154(b) by 821 days.

(21) Appl. No.: 12/343,378

(22) Filed: Dec. 23, 2008

(65) Prior Publication Data

US 2012/0239851 A1  Sep. 20, 2012

Related U.S. Application Data

(60) Provisional application No. 61/075,709, filed on Jun. 25, 2008.

(51) Int. Cl.
*G06F 13/00* (2006.01)
*G06F 11/14* (2006.01)
(52) U.S. Cl.
CPC .................. *G06F 11/1441* (2013.01)
USPC ..................... 711/103; 711/E12.03
(58) Field of Classification Search
USPC ......................................................... 711/103
See application file for complete search history.

(56) References Cited

U.S. PATENT DOCUMENTS

| 5,341,339 | A * | 8/1994 | Wells ........................ 365/185.11 |
| 6,944,060 | B2 | 9/2005 | Honda et al. |
| 7,409,489 | B2 | 8/2008 | Sinclair |
| 7,450,420 | B2 | 11/2008 | Sinclair et al. |
| 7,571,275 | B2 | 8/2009 | Nelson |
| 2002/0184432 | A1* | 12/2002 | Ban ................................. 711/102 |
| 2007/0028040 | A1* | 2/2007 | Sinclair .......................... 711/113 |
| 2007/0083697 | A1* | 4/2007 | Birrell et al. .................. 711/103 |
| 2008/0071973 | A1 | 3/2008 | Chow et al. |
| 2008/0098192 | A1* | 4/2008 | Im et al. ........................ 711/170 |
| 2008/0104309 | A1 | 5/2008 | Cheon et al. |

(Continued)

FOREIGN PATENT DOCUMENTS

| JP | 2008-146254 | 6/2008 |
| JP | 2010-003055 | 1/2010 |

OTHER PUBLICATIONS

Chiang, et al., "A New FTL-Based Flash Memory Management Scheme With Fast Cleaning Mechanism", IEEE Computer Society, The 2008 International Conference on Embedded Software and Systems, 2008 pp. 205-214.

(Continued)

*Primary Examiner* — Sean D Rossiter
(74) *Attorney, Agent, or Firm* — McDermott Will & Emery LLP

(57) ABSTRACT

Methods and systems for the prioritized erasure of data blocks in a flash storage device are provided. A data block in the flash storage device is selected for erasure based upon the number of valid data segments therein, thereby minimizing the number of data segments that are carried over to another data block before erasing the selected data block. The overhead of write operations in the flash storage device is therefore greatly reduced, and the overall performance thereof greatly increased. A method for managing memory operations in a flash storage device having a plurality of data blocks comprises the steps of selecting one of the plurality of data blocks for erasure based upon a number of valid data segments therein, and erasing the selected one of the plurality of data blocks.

26 Claims, 6 Drawing Sheets

(56) References Cited

U.S. PATENT DOCUMENTS

| | | | |
|---|---|---|---|
| 2008/0155184 A1 | 6/2008 | Gorobets et al. | |
| 2008/0201518 A1 | 8/2008 | Kim et al. | |
| 2008/0282024 A1 | 11/2008 | Biswas et al. | |
| 2008/0282025 A1 | 11/2008 | Biswas et al. | |
| 2009/0157950 A1* | 6/2009 | Selinger | 711/103 |
| 2009/0172250 A1* | 7/2009 | Allen et al. | 711/103 |
| 2009/0248964 A1* | 10/2009 | Yano et al. | 711/103 |
| 2009/0265505 A1 | 10/2009 | Yang et al. | |
| 2009/0327590 A1 | 12/2009 | Moshayedi | |
| 2010/0023672 A1 | 1/2010 | Gorogets et al. | |
| 2010/0088482 A1 | 4/2010 | Hinz | |
| 2010/0205352 A1 | 8/2010 | Chu et al. | |
| 2011/0055458 A1* | 3/2011 | Kuehne | 711/103 |
| 2012/0221782 A1* | 8/2012 | Lee et al. | 711/103 |
| 2012/0239853 A1* | 9/2012 | Moshayedi | 711/103 |

OTHER PUBLICATIONS

Hui-Long, et al., "Invalid Block Management Algorithm of Flash Based on CAM", Computer Engineering, Aug. 2009, pp. 251-255, vol. 35, No. 16.

Ilhoon Shin, "Light Weight Sector Mapping Scheme for NAND-Based Block Devices", IEEE Transactions on Consumer Electronics, May 2010, pp. 651-656, vol. 56, No. 2.

Zhou, et al., "Efficient Wear-Leveling Algorithm for Nand Flash Memory Based Solid-State Disk", Photonics and Optoelectronics Meetings (POEM), Proc. of SPIE, 2009 vol. 7517.

Yang, et al., "Circular Balanced Erasing Algorithm for Flash Solid-State Disks", The Ninth International Conference on Electronic Measurement & Instruments (ICEMI), 2009, pp. 4-702 to 4-705.

Chang et al., "Real-Time Garbage Collection for Flash-Memory Storage Systems of Real-Time Embedded Systems", ACM Transactions on Embedded Computing Systems, Nov. 2004, pp. 837-863, vol. 3, No. 4.

Du et al., "Adaptive Garbage Collection Mechanism for N-log Block Flash Memory Storage Systems", Proceedings of the 16th International Conference on Artificial Reality and Telexistance—Workshops (ICAT '06), 2006, IEEE Computer Society.

Gal et al., "Algorithms and Data Structures for Flash Memories", ACM Computing Surveys, Jun. 2005, pp. 138-163, vol. 37, No. 2.

Wu et al., "An Efficient B-Tree Layer for Flash-Memory Storage Systems", 2004, RTCSA 2003, LNCS 2968, pp. 409-430.

* cited by examiner

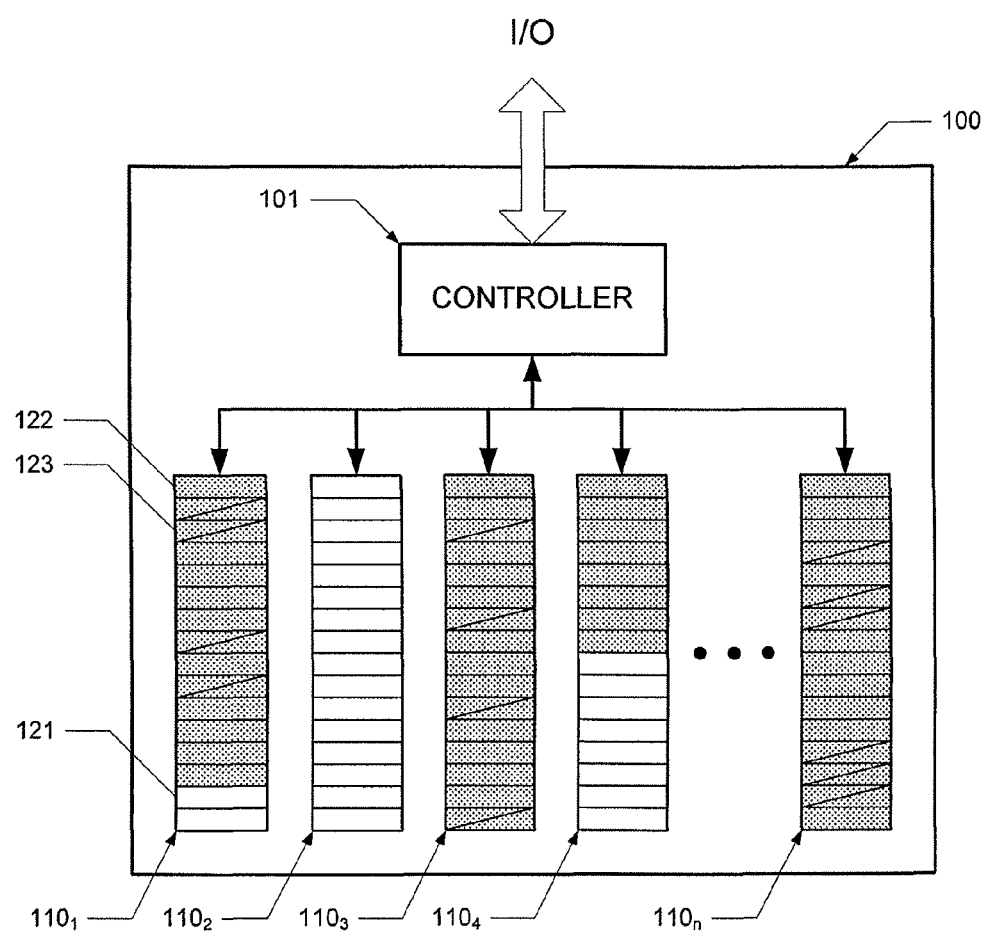

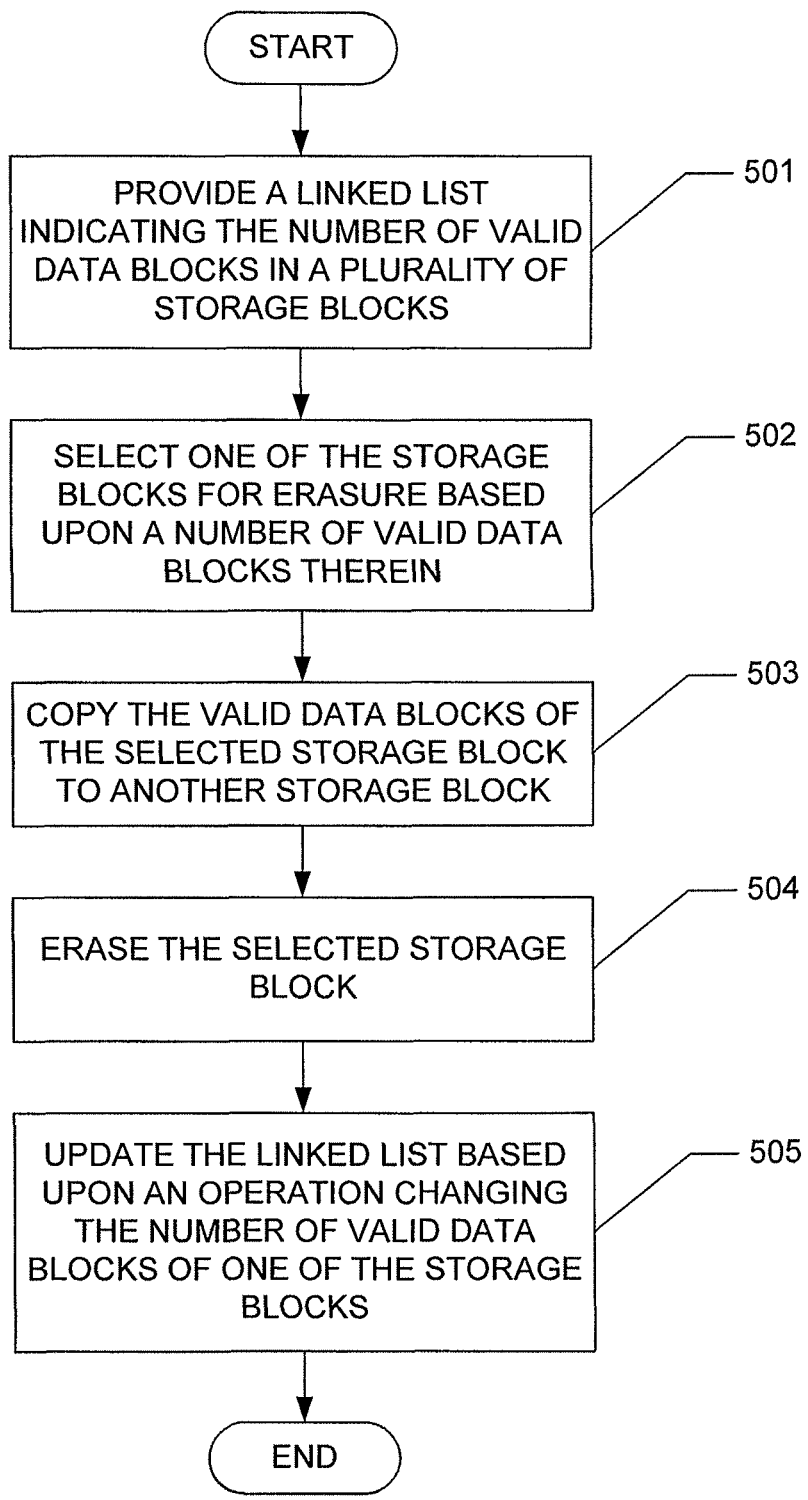

PRIORITIZED ERASURE OF DATA BLOCKS IN A FLASH STORAGE DEVICE

CROSS-REFERENCE TO RELATED APPLICATION

The present application claims the benefit of priority under 35 U.S.C. §119 from U.S. Provisional Patent Application Ser. No. 61/075,709, entitled "SOLID STATE DEVICE," filed on Jun. 25, 2008, the disclosure of which is hereby incorporated by reference in its entirety for all purposes.

FIELD OF THE INVENTION

The present invention generally relates to flash storage devices and, in particular, relates to the prioritized erasure of data blocks in a flash storage device.

BACKGROUND OF THE INVENTION

Flash memory is an improved form of Electrically-Erasable Programmable Read-Only Memory (EEPROM). Traditional EEPROM devices are only capable of erasing or writing one memory location at a time. In contrast, flash memory allows multiple memory locations to be erased or written in one programming operation. Flash memory can thus operate at higher effective speeds than traditional EEPROM.

Flash memory enjoys a number of advantages over other storage devices. It generally offers faster read access times and better shock resistance than a hard disk drive (HDD). Unlike dynamic random access memory (DRAM), flash memory is non-volatile, meaning that data stored in a flash storage device is not lost when power to the device is removed. For this reason, a flash memory device is frequently referred to as a flash storage device, to differentiate it from volatile forms of memory. These advantages, and others, may explain the increasing popularity of flash memory for storage applications in devices such as memory cards, USB flash drives, mobile phones, digital cameras, mass storage devices, MP3 players and the like.

Generally, a flash storage device is comprised of large data blocks that are optimized for sequential data transfer. Consequently, there is considerable overhead in block carry-over and garbage collection operations, which can adversely impact write and rewrite performance. As the density of a flash storage device increases, the number and size of data blocks is increased, resulting in even more overhead and lower performance for write and rewrite operations.

SUMMARY OF THE INVENTION

Various aspects of the subject disclosure solve the foregoing problem by providing methods and systems for the prioritized erasure of data blocks in a flash storage device. A data block in the flash storage device is selected for erasure based upon the number of valid or invalid data segments therein, thereby minimizing the number of data segments that are carried over to another data block before erasing the selected data block. The overhead of write and rewrite operations in the flash storage device is therefore greatly reduced, and the overall performance thereof greatly increased.

According to one aspect of the subject disclosure, a method for managing memory operations in a flash storage device having a plurality of data blocks is provided. The method comprises the steps of selecting one of the plurality of data blocks for erasure based upon a number of valid data segments therein, and erasing the selected one of the plurality of data blocks.

According to another aspect of the subject disclosure, a flash storage device comprises a plurality of data blocks, a data structure configured to indicate a number of valid data segments stored in each of the plurality of data blocks, and a controller configured to erase one of the plurality of data blocks based upon the number of valid data segments therein.

According to yet another aspect of the subject disclosure, a machine readable medium carries one or more sequences of instructions for managing memory operations in a flash storage device having a plurality of data blocks. Execution of the one or more sequences of instructions by one or more processors causes the one or more processors to perform the steps of selecting one of the plurality of data blocks for erasure based upon a number of valid data segments therein, and erasing the selected one of the plurality of data blocks.

It is to be understood that both the foregoing summary of the invention and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings:

FIG. 2 illustrates a flash storage device in accordance with one aspect of the subject disclosure;

FIG. 5 is a flow chart illustrating a method of managing memory operations in a flash storage device having a plurality of data blocks in accordance with one aspect of the subject disclosure.

DETAILED DESCRIPTION OF THE INVENTION

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail to avoid unnecessarily obscuring the present invention.

Figure 1:
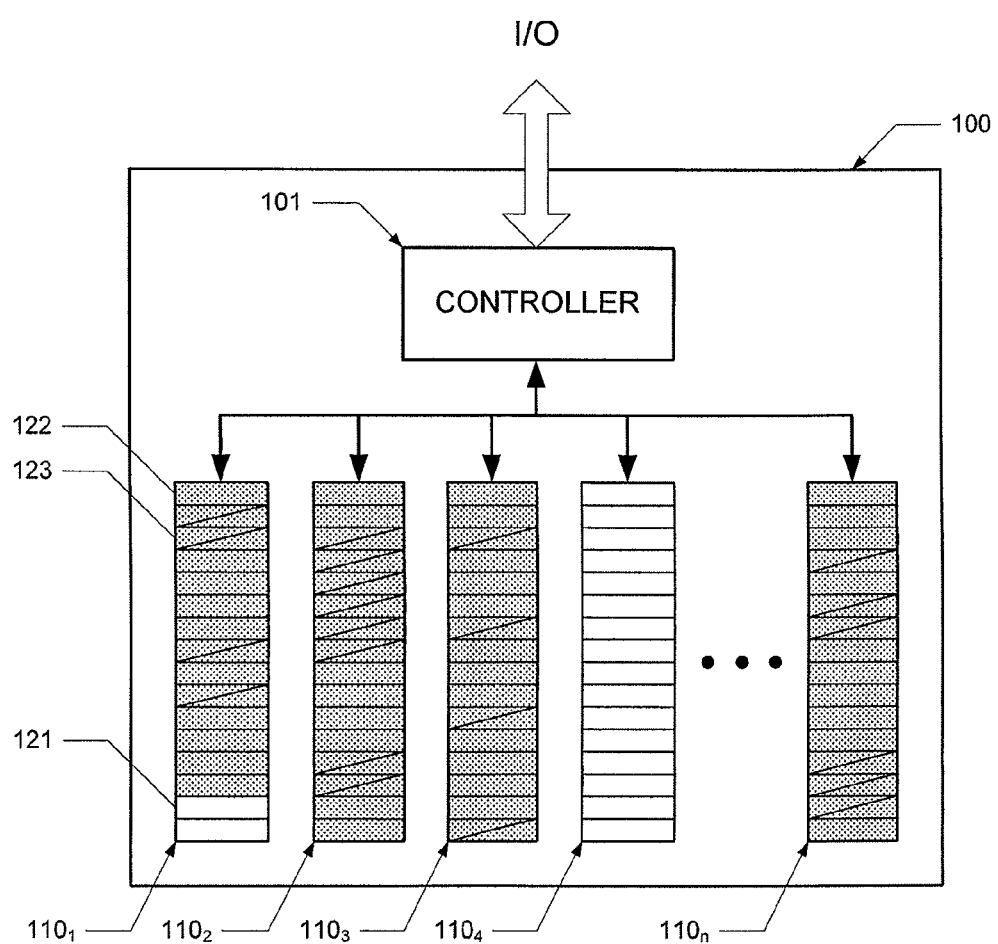
FIG. 1 illustrates a flash storage device in accordance with one aspect of the subject disclosure.

Referring to FIG. 1, a block diagram of a flash storage device according to one aspect of the subject disclosure is depicted. Flash storage device 100 includes a controller 101 and a number of data blocks $110_1, 110_2, 110_3, 110_4 \ldots 110_n$. While the term "data block" is used throughout the description, it will be understood by those of skill in the art that the term data block is frequently used interchangeably with the term "memory block" in the art. Each data block has a plurality of data segments for storing data. In the present exemplary flash storage device, each data block is illustrated as including 16 data segments. The scope of the present invention, however, is not limited to such an arrangement. Rather, as will be apparent to one of skill in the art, a data block may be configured with more or less than 16 data segments as desired to provide various levels of storage space. For example, in accordance with one aspect of the subject disclosure, a data block may include 32 data segments of 4 kilobytes (kB) each to provide 124 kB of data storage. While data blocks are usually configured with $2^n$ data segments (e.g., 16, 32, 64, 128, 256, etc.), the scope of the invention is not so limited. Similarly, while each data block $110_1$-$110_n$ is illustrated as including the same number of data segments, the scope of the invention is not so limited, as a flash storage device may comprise a number of data blocks with differing capacities and/or numbers of data segments. In accordance with one aspect of the subject disclosure, a data block may span over more than one flash memory chip in a storage array of multiple chips. In accordance with another aspect, however, a data block is stored on a single flash memory chip in a storage array of multiple flash memory chips.

Three categories of data segments are illustrated with different graphical conventions in FIG. 1. In particular, empty data segments, such as data segment 121, are indicated by a white field surrounded with a black line, data segments containing valid data, such as data segment 122, are indicated by a shaded field surrounded by a black line, and data segments containing invalid data, such as data segment 123, are indicated by a shaded field surrounded by and divided diagonally by black lines. A data segment may contain invalid data as a result of a rewrite operation, in which a logical address originally associated with one data segment may be provided with updated data, whereupon controller 101 writes the updated data to an empty data segment and marks the previous data segment invalid, in what is known as a "carry-over" operation. A data segment may also contain invalid data as a result of an erasure operation, wherein the data associated with a logical address is deleted, and the corresponding data segment is marked for later erasure during a "garbage collection" operation, in which data areas that have been marked for erasure are actually erased. Other manners in which a data segment may be marked or rendered invalid will be readily apparent to those of skill in the art, and are omitted herefrom for brevity's sake.

Flash storage device 100 further includes a data structure for storing information about the contents of each data block $110_1$-$110_n$. In particular, the data structure stores information about the number of valid data segments in each of the data blocks. For example, the data structure stores information indicating that data block $110_1$ has 10 valid segments, that data block $110_2$ has 8 valid segments, etc. This information allows controller 101 to select a data block to erase based upon the number of valid segments therein. In particular, this information allows controller 101 to choose a data block with the smallest number of valid segments to erase, reducing the overhead associated with carry-over and erasure operations.

The data structure may be provided on a flash storage device in any one of a number of manners. For example, in accordance with one exemplary aspect of the subject disclosure, the data structure may be provided in a random access memory (RAM) or dynamic random access memory (DRAM) module of flash storage device 100. According to one aspect, controller 101 may include DRAM or RAM modules, as illustrated in greater detail below with respect to FIG. 6. Alternatively, the data structure may be provided in one of the plurality of data blocks of flash storage device. Where the data structure is stored may depend upon a power state of the flash storage device. When in an unpowered condition, the data structure may be copied from a volatile storage medium (e.g., DRAM) to a non-volatile storage medium (e.g., a data block) to prevent the information in the data structure from being lost when the reserve power of flash storage device 100 (e.g., provided by capacitors, super-capacitors, batteries, etc.) is exhausted.

In the present exemplary embodiment, controller 101 may choose data block $110_2$ for erasure, as data block $110_2$ includes only 8 valid segments. Accordingly, a carry-over operation for the valid data in data block $110_2$ will require only 8 data segments worth of data to be copied to another data block. According to one aspect of the subject disclosure, the valid data segments may be copied to a pre-erased data block, such as data block $110_4$. In accordance with other aspects of the subject disclosure, however, the valid data segments may be copied to empty data segments of another partially-utilized data block. In accordance with the present exemplary aspect, when controller 101 determines to erase data block $110_2$, it copies the valid data segments therefrom to pre-erased data block $110_4$, and erases all of the data segments, invalid and valid, in data block $110_2$. The result of this operation is illustrated in FIG. 2, in which flash storage device 100 is illustrated following the copy-over of valid data from data block $110_2$ to $110_4$, and the erasure of data block $110_2$, in accordance with one aspect of the subject disclosure.

Following the carry-over operation, the information in the data structure is updated to reflect the new valid/invalid data segment counts for data blocks $110_2$ and $110_4$. In accordance with one aspect of the subject disclosure, controller 101 updates the information in the data structure every time there is an operation in flash storage device 100 which changes the number of valid data segments in one of the data blocks.

Controller 101 may choose to erase data block $110_2$ based on the number of valid data segments therein corresponding to a predetermined criteria (e.g, processor 101 may seek out and erase any data block with less than some number x of valid data segments as part of a background maintenance task), or because data block $110_2$ (prior to the foregoing operation) has the least number of valid data segments of any non-erased data segment in flash storage device 100. According to various aspects of the subject disclosure, seeking and erasing storage blocks with certain numbers of valid or invalid data segments may be done at a predetermined time, a dynamically determined time, upon a triggering event (e.g., a command from the host, or a determination of lack of capacity, etc.) or at an opportune time (e.g., when the device is not in active mode, or as a background operation). According to one exemplary aspect of the subject disclosure, controller 101 may determine to erase some data blocks when the list of available pre-erased data blocks (those that were erased in anticipation of a future write operation, but have yet to be written to) falls below a predetermined amount. The predetermined amount may, in accordance with one aspect, be set to different levels by different applications making use of flash storage device 100.

Figure 3A:
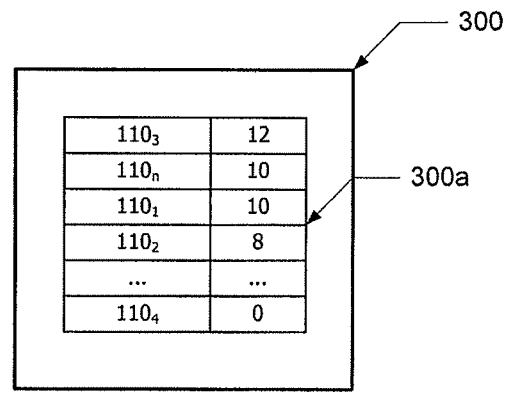
FIGS. 3a and 3b illustrate a data structure of a flash storage device in accordance with one aspect of the subject disclosure.
Figure 3B:
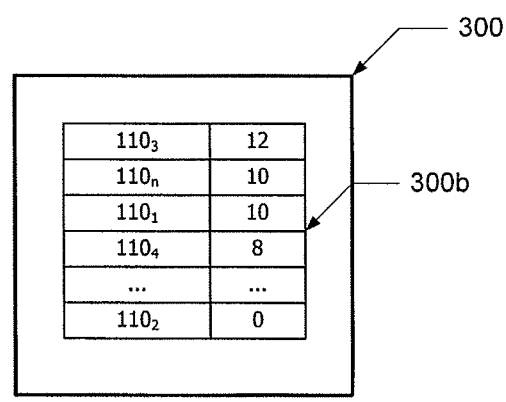

FIGS. 3a and 3b illustrate a data structure 300 before and after the foregoing carry-over and erase operation, respectively, in accordance with one aspect of the subject disclosure. As can be seen with reference to FIG. 3a, data structure 300 includes a linked list 300a which contains information about the number of valid data segments in each data block $110_1$-$110_n$ (e.g., in the present exemplary aspect, a list with a node associating each data block with the number of valid data segments therein). In accordance with the present exemplary aspect of the subject disclosure, linked list 300a is ordered from most valid data segments to least valid data segments. Maintaining an ordered link lists allows controller 101 to quickly locate a suitable data block for deletion, simply by choosing an appropriate data segment from the appropriate end of the list (e.g., the bottom of the list, which represents the data block with the most invalid data segments).

It should be noted that data block $110_4$ is illustrated as occupying the bottom position in linked list 300a, as this data block contains no valid data segments, inasmuch as the entire data block is empty (e.g., from being previously erased, or from not yet having had data written thereto). Accordingly, controller 101 does not select data block $110_4$ for erasure. In accordance with the foregoing exemplary carry-over and erase operations, controller 101 selected the data block having the lowest number of valid data segments, and which was not already empty (i.e., in the present example, data block $110_2$). After the carry-over and erase operations described in greater detail above, linked list 300a is reordered to maintain the ordering from most to least valid data segments. Re-ordered linked list 300b is illustrated in FIG. 3b, in the condition following the foregoing carry-over and erase operations.

According to one aspect of the subject disclosure, the number of invalid and empty data segments in a data block, together with the total number of data segments therein, can be used to determine the number of valid data segments in the data block. For example, with respect to a data block with 16 data segments, such as data block $110_1$, the number of valid data segments can be determined by subtracting the number of empty data segments (2) and the number of invalid data segments (4) from the total number of data segments (16) to obtain the number of valid data segments: 16−4−2=10 valid data segments.

Figure 4A:
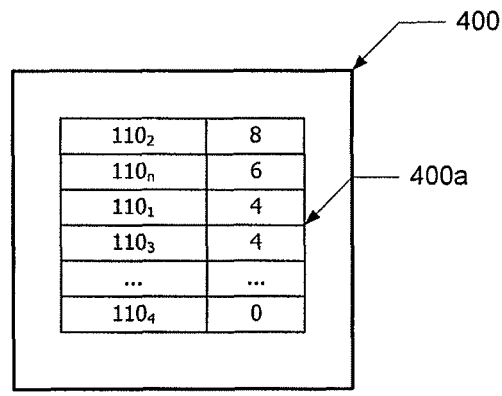
FIGS. 4a and 4b illustrate a data structure of a flash storage device in accordance with one aspect of the subject disclosure.
Figure 4B:
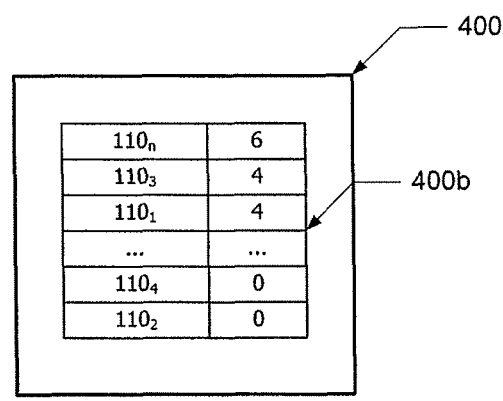

According to another aspect of the subject disclosure, a data structure may be provided with information regarding the number of invalid data segments in each data block $110_1$-$110_n$, in accordance with one aspect of the subject disclosure. FIGS. 4a and 4b illustrate data structure 400 configured to store the number of invalid data segments in each data block $110_1$-$110_n$ before and after, respectively, the foregoing carry-over and erase operations. As can be seen with reference to FIG. 4a, data structure 400 includes a linked list 400a which contains information about the number of invalid data segments in each data block $110_1$-$110_n$ (e.g., in the present exemplary aspect, a list with a node associating each data block with the number of invalid data segments therein). In accordance with the present exemplary aspect of the subject disclosure, linked list 400a is ordered from most invalid data segments to least invalid data segments. Maintaining an ordered link lists allows controller 101 to quickly locate a suitable data block for deletion, simply by choosing a data segment from the appropriate end of the list (e.g., the head of the list, which represents the data block with the most invalid data segments). After the carry-over and erase operations described in greater detail above, linked list 400a is reordered, to maintain the ordering from most to least valid data segments. Re-ordered linked list 400b is illustrated in FIG. 4b, in the condition following the foregoing carry-over and erase operations.

While in the foregoing exemplary embodiments, the data structures have been illustrated as including a single linked list, the scope of the present invention is not so limited. Rather, as will be apparent to those of skill in the art, information regarding the number of valid data segments in each data block of a flash storage device may be provided in any one of a number of ways. For example, rather than a single linked list, a data structure may comprise multiple linked lists, whereby data blocks with similar numbers of valid data segments may be included on a single list (e.g., one list indicating data blocks with between 0 and 127 valid data segments, another list indicating data blocks with between 128 and 255 valid data segments, etc.). In such an embodiment, controller 101 may not order each linked list by number of valid data segments, but may rather provide a "rough" sorting feature by organizing data blocks into "bins" of similarly situated data blocks. This allows controller 101 to simply select one data block from the unordered list representing data blocks with the least number of valid data segments (e.g., data blocks with less than 127 valid data segments out of 4096 data segments) upon which to perform carry-over and erase operations. Controller 101 may update the unordered lists when an operation changes the number of valid data segments in a given data block, moving the data block to the appropriate list that reflects the updated number of valid data segments therein.

While in the foregoing exemplary embodiments, the data structures have been described as including one or more linked lists for keeping track of the number of valid data segments in each data block of a flash storage device, the scope of the present invention is not limited to such an arrangement. Rather, as will be apparent to those of skill in the art, any one of a number of different data structures may be employed to maintain this information, including, for example, tables, pointers, and the like.

FIG. 5 is a flow chart illustrating a method of managing memory operations in a flash storage device having a plurality of data blocks, in accordance with one aspect of the subject disclosure. The method begins with step 501, in which one or more linked lists indicating the number of valid data segments in a plurality of data blocks are provided. According to various aspect of the subject disclosure, the number of valid data segments in a data block may be indicated by either the number of valid data segments or the number of invalid data segments therein, as discussed in greater detail above. In step 502, one of the data blocks is selected for erasure based upon the number of valid data segments therein. The valid data segments of the selected data block are copied to another data block in step 503, and in step 504, the selected data block is erased. In step 505, the one or more linked lists are updated based upon an operation changing the number of valid data segments of one of the data blocks (e.g., the carry-over and erase operation, or any one of a number of other operations that may have taken place or may be taking place in the flash storage device). The step of updating may, in some embodiments, include reordering the one or more linked lists in the data structure based on the changed information therein (e.g., moving the newly-erased data block to one end of the linked list based on the new number of valid/invalid data segments therein). In another embodiment, the updating step may involve moving information regarding a data block from one linked list to another linked list, based upon the changed information corresponding thereto (e.g., moving a data block from a linked list corresponding to data blocks with a large number of invalid data segments to a linked list corresponding to data blocks with a low number of invalid data segments).

Figure 6:
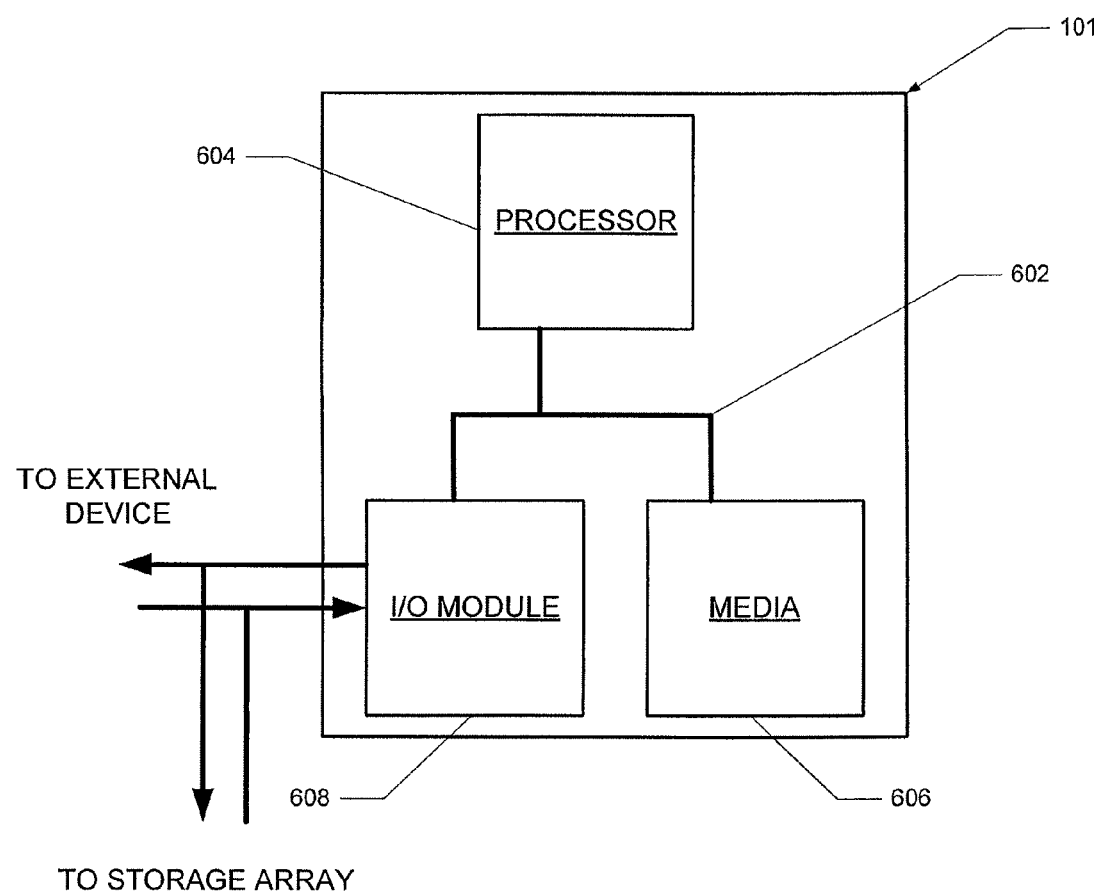
FIG. 6 is a block diagram that illustrates processor 101 in greater detail, in accordance with one aspect of the subject disclosure

FIG. 6 is a block diagram that illustrates controller 101 in greater detail, in accordance with one aspect of the subject disclosure. Controller 101 includes a bus 602 or other communication mechanism for communicating information, and a processor 604 coupled with bus 602 for processing information. Controller 101 also includes a machine-readable media 606 for storing a data structure, such as a random access memory ("RAM") or other dynamic storage device, coupled to bus 602 for storing information and instructions to be executed by processor 604. Media 606 may also be used for storing temporary variables or other intermediate information during execution of instructions by processor 604. Media 606 may also comprise non-volatile storage media, such as flash memory, a magnetic disk or an optical disk, coupled to bus 602 for storing information and instructions. Controller 101 may be coupled via I/O module 608 to data blocks $110_1$-$110_n$, and to an external system with which flash storage device 100 communicates.

According to one aspect of the present invention, managing memory operations in a flash storage device is performed by controller 101 in response to processor 604 executing one or more sequences of one or more instructions contained in media 606. Such instructions may be read into media 606 from another machine-readable medium, such as through I/O module 608. Execution of the sequences of instructions contained in media 606 causes processor 604 to perform the process steps described herein. One or more processors in a multi-processing arrangement may also be employed to execute the sequences of instructions contained in media 606. In alternative embodiments, hard-wired circuitry may be used in place of or in combination with software instructions to implement various embodiments of the present invention. Thus, embodiments of the present invention are not limited to any specific combination of hardware circuitry and software.

The term "machine-readable medium" as used herein refers to any medium that participates in providing instructions to processor 604 for execution. Such a medium may take many forms, including, but not limited to, non-volatile media, volatile media, and transmission media. Non-volatile media include, for example, optical or magnetic disks. Volatile media include dynamic memory, such as memory 606. Transmission media include coaxial cables, copper wire, and fiber optics, including the wires that comprise bus 602. Transmission media can also take the form of acoustic or light waves, such as those generated during radio frequency and infrared data communications. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, a carrier wave, or any other medium from which a computer can read.

The description of the invention is provided to enable any person skilled in the art to practice the various embodiments described herein. While the present invention has been particularly described with reference to the various figures and embodiments, it should be understood that these are for illustration purposes only and should not be taken as limiting the scope of the invention.

There may be many other ways to implement the invention. Various functions and elements described herein may be partitioned differently from those shown without departing from the spirit and scope of the invention. Various modifications to these embodiments will be readily apparent to those skilled in the art, and generic principles defined herein may be applied to other embodiments. Thus, many changes and modifications may be made to the invention, by one having ordinary skill in the art, without departing from the spirit and scope of the invention.

A reference to an element in the singular is not intended to mean "one and only one" unless specifically stated, but rather "one or more." The term "some" refers to one or more. Underlined and/or italicized headings and subheadings are used for convenience only, do not limit the invention, and are not referred to in connection with the interpretation of the description of the invention. All structural and functional equivalents to the elements of the various embodiments of the invention described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

What is claimed is:

1. A method for managing memory operations in a flash storage device having a plurality of data blocks, each block comprising a plurality of data segments, the method comprising the steps of:

providing one or more linked lists comprising a plurality of nodes, each of the plurality of nodes indicating the number of valid data segments in a corresponding one of the plurality of data blocks;

ordering the plurality of nodes in the one or more linked lists based upon the number of valid data segments indicated therein;

selecting one of the plurality of data blocks for erasure based on the ordering of the one or more linked lists such that the selected data block corresponds to one of the plurality of nodes indicating a lowest number of valid data segments; and erasing the selected data block when an available number of pre-erased data blocks falls below a predetermined amount.

2. The method according to claim 1, wherein the step of selecting one of the plurality of data blocks for erasure further comprises selecting the data block for erasure based upon a number of invalid data segments therein.

3. The method according to claim 1, wherein the step of erasing comprises copying the valid data segments of the selected data block to another one of the plurality of data blocks.

4. The method according to claim 3, wherein the other data block is a pre-erased data block.

5. The method according to claim 1, wherein the data segments in each of the plurality of data segments comprises 4 kB.

6. The method according to claim 1, wherein each of the plurality of nodes indicates the number of valid data segments in a corresponding one of the plurality of data blocks by indicating a number of invalid data segments in the corresponding one of the plurality of data blocks.

7. The method according to claim 1, wherein the lowest number of valid data segments corresponds to a predetermined number of valid data segments.

8. The method according to claim 1, wherein the one or more linked lists comprise a plurality of linked lists, each of the plurality of linked lists indicating a number of valid data segments in each data block of a distinct subset of the plurality of data blocks, each subset of the plurality of data blocks having a predefined range of valid data segments.

9. The method according to claim 1, wherein the selected one of the plurality of data blocks corresponds to one of the plurality of nodes at an end of one of the one or more linked lists.

10. The method according to claim 1, further comprising the step of:

updating the one or more linked lists based upon an operation in the flash storage device which changes the number of valid data segments of one of the plurality of data blocks.

11. The method according to claim 1, wherein the step of selecting one of the plurality of data blocks for erasure is part of a background maintenance task.

12. The method according to claim 1, wherein the step of selecting one of the plurality of data blocks for erasure is triggered in response to a rewrite operation of the flash storage device.

13. A flash storage device, comprising:
a plurality of data blocks, each block comprising a plurality of data segments; and
a controller configured to:
provide one or more linked lists comprising a plurality of nodes, each of the plurality of nodes indicating the number of valid data segments in a corresponding one of the plurality of data blocks;
order the plurality of nodes in the one or more linked lists based upon the number of valid data segments indicated therein;
select one of the plurality of data blocks for erasure based on the ordering of the one or more linked lists such that the selected data block corresponds to one of the plurality of nodes indicating a lowest number of valid data segments; and
erase the selected data block when an available number of pre-erased data blocks falls below a predetermined amount.

14. The flash storage device according to claim 13, wherein the controller is configured to erase the one of the plurality of data blocks by erasing the one of the plurality of data blocks based upon a number of invalid data segments therein.

15. The flash storage device according to claim 13, wherein the controller is further configured to copy the valid data segments of the selected one of the plurality of data blocks to another one of the plurality of data blocks before erasing the selected one of the plurality of data blocks.

16. The flash storage device according to claim 15, wherein the another one of the plurality of data blocks is a pre-erased data block.

17. The flash storage device according to claim 13, wherein the data segments in each of the plurality of data segments comprises 4 kB.

18. The flash storage device according to claim 13, further comprising a machine-readable medium configured to store the one or more linked lists.

19. The flash storage device according to claim 13, wherein each of the plurality of nodes indicates the number of valid data segments in a corresponding one of the plurality of data blocks by indicating a number of invalid data segments in the corresponding one of the plurality of data blocks.

20. The flash storage device according to claim 13, wherein the lowest number of valid data segments corresponds to a predetermined number of valid data segments.

21. The flash storage device according to claim 13, wherein the one or more linked lists comprise a plurality of linked lists, each of the plurality of linked lists indicating a number of valid data segments in each data block of a distinct subset of the plurality of data blocks, each subset of the plurality of data blocks having a predefined range of valid data segments.

22. The flash storage device according to claim 13, wherein the selected one of the plurality of data blocks corresponds to one of the plurality of nodes at an end of one of the one or more linked lists.

23. The flash storage device according to claim 13, wherein the controller is further configured to update the one or more linked lists based upon an operation in the flash storage device which changes the number of valid data segments of one of the plurality of data blocks.

24. The flash storage device according to claim 13, wherein the controller is configured to select one of the plurality of data blocks for erasure as part of a background maintenance task.

25. The flash storage device according to claim 13, wherein the controller is configured to select one of the plurality of data blocks for erasure in response to a rewrite operation of the flash storage device.

26. A non-transitory machine readable medium storing one or more sequences of instructions for managing memory operations in a flash storage device having a plurality of data blocks, each block comprising a plurality of data segments, wherein execution of the one or more sequences of instructions by one or more processors causes the one or more processors to perform the steps of:
providing one or more linked lists comprising a plurality of nodes, each of the plurality of nodes indicating the number of valid data segments in a corresponding one of the plurality of data blocks;
ordering the plurality of nodes in the one or more linked lists based upon the number of valid data segments indicated therein;
selecting one of the plurality of data blocks for erasure based on the ordering of the one or more linked lists such that the selected data block corresponds to one of the plurality of nodes indicating a lowest number of valid data segments; and
erasing the selected one of the plurality of data blocks when an available number of pre-erased data blocks falls below a predetermined amount.

* * * * *